United States Patent
Ishizuka et al.

(10) Patent No.: US 6,902,843 B2
(45) Date of Patent: Jun. 7, 2005

(54) NI-PLATED STEEL PLATE FOR ALKALI-MANGANESE DRY CELL ANODE CAN AND ALKALI-MANGANESE DRY CELL ANODE CAN

(75) Inventors: Kiyokazu Ishizuka, Himeji (JP); Teruaki Yamada, Himeji (JP); Michihiro Nouno, Himeji (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/250,864
(22) PCT Filed: Jan. 9, 2002
(86) PCT No.: PCT/JP02/00058
 § 371 (c)(1), (2), (4) Date: Jul. 9, 2003
(87) PCT Pub. No.: WO02/055764
 PCT Pub. Date: Jul. 18, 2002
(65) Prior Publication Data
 US 2004/0076876 A1 Apr. 22, 2004
(30) Foreign Application Priority Data
 Jan. 9, 2001 (JP) .................................... 2001-001591
(51) Int. Cl.⁷ ........................... H01M 2/02; H01M 2/16
(52) U.S. Cl. ...................... 429/166; 429/164; 429/176
(58) Field of Search .................................. 429/163, 166

(56) References Cited
 FOREIGN PATENT DOCUMENTS

| | | | |
|---|---|---|---|
| DE | 3916050 | * 11/1990 | ............ H01M/10/28 |
| EP | 884793 | * 12/1998 | ............ H01M/4/24 |
| JP | 0521044 | 1/1993 | |
| JP | 07122246 | 5/1995 | |
| JP | 07300695 | 11/1995 | |
| JP | 08138636 | 5/1996 | |
| JP | 09306439 | 11/1997 | |
| JP | 10172521 | 6/1998 | |
| JP | 10172522 | 6/1998 | |
| JP | 11102671 | 4/1999 | |
| JP | 11329377 | 11/1999 | |
| JP | 11329378 | 11/1999 | |
| JP | 00192281 | 7/2000 | |
| WO | 9511527 | 4/1995 | |
| WO | 9744835 | 11/1997 | |

* cited by examiner

Primary Examiner—Mark Ruthkosky
(74) Attorney, Agent, or Firm—Baker Botts LLP

(57) ABSTRACT

The present invention provides a steel sheet material used for a positive electrode can and a positive electrode can for an alkaline manganese battery capable of improving the battery characteristics for an alkaline manganese battery, characterized in that the plated steel sheet for a positive electrode can for an alkaline manganese battery has Ni-based diffusion plating layer having on the top layer many small pinholes of diameter not greater than 1 μm, i.e. submicron pinholes, formed on the surface of the steel sheet to be used as an internal surface of the can. Said submicron pinholes preferably have, as observed by SEM, diameter in the range of 0.1~1 μm and are present at density not less than 30 pcs/(10 μm×10 μm). The surface of the steel sheet to be used as an external surface of the can preferably has a Fe—Ni diffusion plating layer and a Ni plating layer that has been softened by recrystallization.

6 Claims, 2 Drawing Sheets

NI-PLATED STEEL PLATE FOR ALKALI-MANGANESE DRY CELL ANODE CAN AND ALKALI-MANGANESE DRY CELL ANODE CAN

CROSS-REFERENCE TO RELATED APPLICATION(S)

This application is a national stage application of PCT Application No. PCT/JP02/00058 which was filed on Jan. 9, 2002 and published on Jul. 18, 2002 as International Publication No. WO 02/055764 (the "International Application"). This application claims priority from the International Application pursuant to 35 U.S.C. § 365. The present application also claims priority under 35 U.S.C. § 119 from Japanese Patent Application No. 2001-001591, filed on Jan. 9, 2001, the entire disclosure of which is incorporated herein by reference.

FIELD OF THE INVENTION

The present invention relates to a plated steel sheet material used for a positive electrode can for an alkaline manganese battery and, more particularly, to a plated steel sheet material and a positive electrode can for an alkaline manganese battery capable of improving the battery characteristics and a corrosion resistance of an alkaline manganese battery.

BACKGROUND INFORMATION

In an alkaline manganese battery, a Ni-plated steel sheet is generally used as the material for a container (positive electrode can) which is used for filling a positive electrode material, a negative electrode material, an electrolyte solution, etc., and which is also used as a positive electrode terminal. Conventionally, Ni plating has been performed by so-called barrel plating method in which plating is performed after the can has been formed. This conventional method may have problems such as insufficient adherence of the Ni-plating layer to the internal surface of the can, or instability in the quality of the plating layer. Accordingly, such method may be replaced by a method in which a pre-plated steel sheet is processed into the form of a can. However, this further method which uses a pre-plated steel sheet is also problematic in that, as the Ni plating layer has high hardness and low extensibility, the pre-plated steel sheet has poor press workability and the plating layer tends to be separated during the processing, thus leading to deterioration in corrosion resistance. In order to resolve this problem, another conventional method may be employed in which heat treatment is performed after the Ni plating to form a Fe—Ni diffusion layer in the interface between the Ni plating layer and the iron substrate so as to improve the close adherence of the Ni plating layer, as well as to improve the extensibility of the Ni plating layer by recrystallization and softening of Ni. The use of this method has led to a significant improvement of the press workability and corrosion resistance.

In order to attain high capacity in an alkaline manganese battery, it is preferable to increase the content of manganese dioxide in the positive mix. However, such increase may lead to an increase in contact resistance due to the low electrical conductivity of manganese dioxide itself. As a countermeasure, a conductive film is formed on the internal surface of the positive electrode can. With such alkaline manganese battery, although the contact resistance is initially low, the contact resistance increases rapidly after prolonged storage at high temperature, thus leading to a degradation of the battery characteristics.

Examples of improvements in the above-mentioned battery characteristics, from the side of the steel sheet material, may be found in the following patent publications.

For example, Japanese Patent Publication No. 05-21044 describes that, as material for DI drawing and ironing, hard plating such as would produce cracks in Ni plating layer during the processing is effective in causing the surface area in contact with the positive electrode material to be increased by the cracks produced during the processing and permitting the battery characteristics to be thereby improved. Various examples of hard plating are described therein such as Ni plating containing organic additives, the aforementioned plating applied via a Fe—Ni diffusion layer, and the like, are described.

Japanese Patent Publication No. 07-122246 and 07-300695, International Patent Publication WO 95/11527, and/or the like, describe a method for ensuring sufficient contact with the positive electrode material by forming a very hard alloy (such as $Ni_3Sn$, $Ni_3Sn_2$, $Ni_3Sn_4$, etc.) plating layer on the top layer corresponding to the inner surface of a positive electrode can, and producing cracks in the plating layer during press working.

In addition, Japanese Patent Publication No. 08-138636 discloses a method for increasing the surface area in contact with the positive electrode material, and thereby improving the battery characteristics, in which Sn and Ni are plated as dual plating layer, in this order, onto a steel sheet and disposing the plating layer converted into an alloy layer by heat treatment so as to serve as an internal surface of the positive electrode can. In this manner, surface cracks may be produced during press working due to the difference of extensibility between the upper layer being composed mainly of Ni and the lower layer being composed mainly of Sn.

Japanese Patent Publication No. 09-306439 describes a method in which an Ni alloy plating layer having different hardnesses within the plating layer is formed such that the plating layer to be used for the internal surface of a can has higher hardness, for increasing the surface roughness of the internal surface of a can during press working so as to improve the close adherence to the positive electrode material. As an exemplary method for varying the hardness in an alloy plating layer, varying the type or the amount of the metal to be alloyed with Ni or varying the amount of an organic additive, is disclosed in this publication as well.

Further, in Japanese Patent Publication Nos. 10-172521 and 10-172522, a method is disclosed in which a Ni—Co alloy plating layer is formed, or Ni—Co alloy plating is applied via a Ni plating layer. As the Ni—Co alloy is very hard, very fine cracks may be produced in the plating layer during the press working and a very fine roughness is thereby formed so as to improve the contact with the positive electrode material, to thereby improve the battery performance.

Japanese Patent Publication No. 11-102671 describes a method in which Ni—Ag alloy plating or Ni—Cr alloy plating is applied via a Ni plating layer onto the surface to be used as the internal surface of a positive electrode can. Since both the Ni—Ag alloy plating layer and the Ni—Cr alloy plating layer are very hard, very fine cracks may be produced in the plating layer during press working and a very fine roughness is thereby formed so as to improve the contact with the positive electrode material, to thereby improve the battery performance.

Additionally, in Japanese Patent Publication Nos. 11-329377 and 11-329378, a method is described to utilize a Ni—Bi alloy plating layer and a Ni—In alloy plating layer, respectively, to improve the alkali resistance of the aforementioned Ni—Sn alloy plating layer having low alkali resistance, to thereby improve the battery performance.

The various methods in prior art as described above all aim to form a very fine roughness on the internal surface of a can during press working, and for such purpose, a steel sheet having a hard plating layer formed thereon is mainly used to produce fine cracks in the plating layer during press working. However, there may be a problem associated with the concept of producing cracks in the plating layer during press working that the production of cracks in the plating layer varies depending upon the variation of the condition of the press working, and therefore, stable battery characteristics may not be obtained.

In order to overcome the above-described problem, another method is provided and disclosed in International Patent Publication WO 97/44835 for increasing the close adherence to the positive electrode material by applying an electrolytic treatment in acidic solution after Ni plating and thereby roughening the surface. Japanese Patent Publication No. 2000-192281 describes a method in which, after discontinuously forming Ni plated layers, etching is performed in an acidic solution and, further, a Ni plating layer is formed to obtain a surface having many small pits formed thereon. However, these methods require equipment for treatment in an acidic solution, and are therefore undesirable in terms of cost.

It is an object of the present invention to overcome the above-described problems and to provide a plated steel sheet material to be used as a positive electrode can for an alkaline manganese battery and a positive electrode can for an alkaline manganese battery having good battery characteristics.

All cited references are hereby incorporated herein by reference in their entireties.

SUMMARY OF THE INVENTION

According to one exemplary embodiment of the present invention, a Ni plated steel sheet which may be used for a positive electrode can for an alkaline manganese battery. For example, a Ni-based diffusion plating layer having pinholes, as observed by a Scanning Electron Microscope ("SEM"), of diameter in the range of 0.1~1 $\mu$m and at density of not less than 30 pcs/(10 $\mu$m×10 $\mu$m) on its surface is formed on the surface of the steel sheet to be used as an internal surface of the can. A Fe—Ni diffusion plating layer and a Ni plating layer may be formed on the surface of the steel sheet to be used as an external surface of the can. In addition, the Ni plating layer, on the surface of said steel sheet to be used as an external surface of the can, may be softened by recrystallization.

In another exemplary embodiment of the present invention, a positive electrode can for an alkaline manganese battery may be provided. The positive electrode can may be composed of a steel sheet which has, on the surface to be used as an internal surface of the can, a Ni-based diffusion plating layer formed with pinholes, as observed by SEM, of diameter in the range of 0.1~1 $\mu$m and at density of not less than 30 pcs/(10 $\mu$m×10 $\mu$m) on the surface. The positive electrode can for the battery may be composed of a steel sheet, which has a Fe—Ni diffusion plating layer and a Ni plating layer formed on the surface, to be used as an external surface of the can. The Ni plating layer on the surface to be used as an external surface of the positive electrode can for the battery may be softened by recrystallization.

DETAILED DESCRIPTION OF THE EXEMPLARY EMBODIMENT(S)

Figure 1:
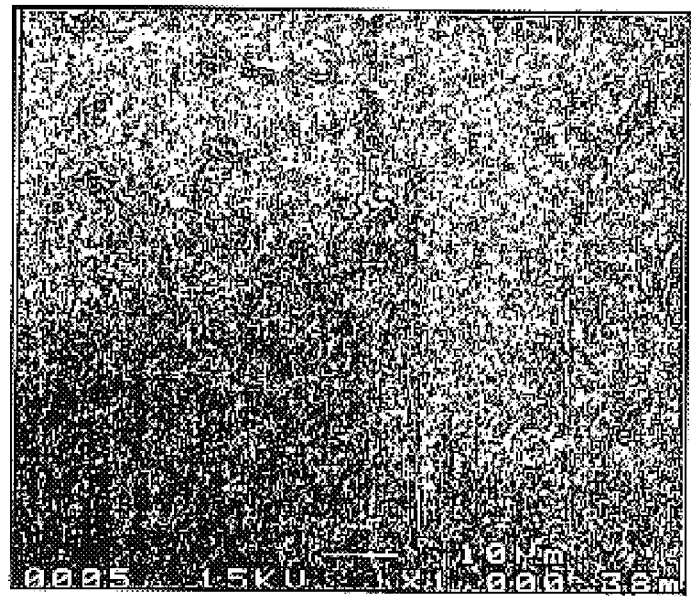
FIG. 1 is a SEM photograph (×1000) showing a surface of a Ni plated steel sheet having a number of sub-micron sized pinholes according to the present invention.
Figure 2:
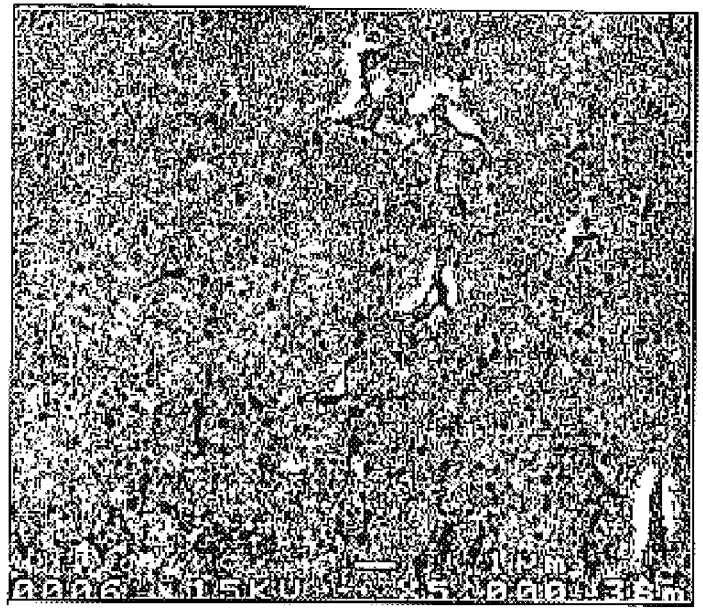
FIG. 2 is a SEM photograph (×5000) showing a surface of a Ni plated steel sheet having a number of sub-micron sized pinholes according to the present invention.
Figure 3:
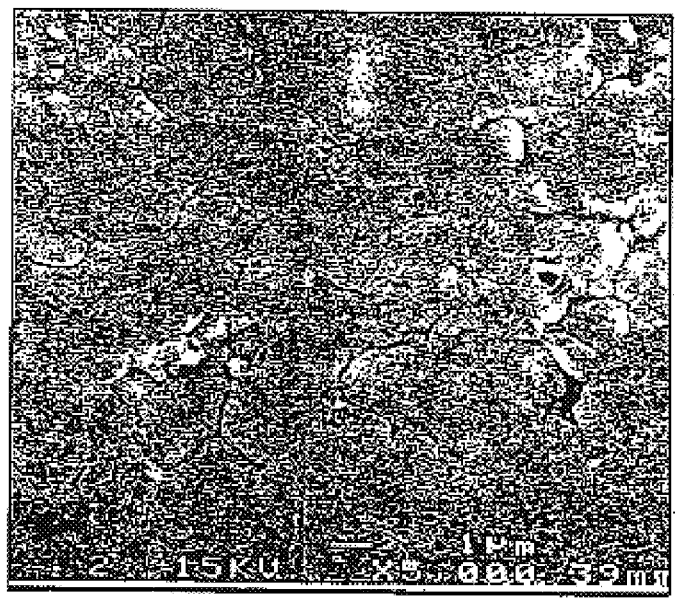
FIG. 3 is a SEM photograph (×5000) showing a surface of a conventional Ni plated steel sheet.

As an initial matter, constructive preferences of the surface of a steel sheet corresponding to the internal surface of a positive electrode can for an alkaline manganese battery in accordance with an exemplary embodiment of the present invention are described below. A Ni based diffusion plating layer is formed on the surface to be used as an internal surface of the can, and it is required the surface of the plating layer have many pinholes of diameter not greater than 1 $\mu$m (hereinafter referred to as sub-micron pinholes). Examples of a Scanning Electron Microscope ("SEM") photograph of the steel sheet surface having a plating layer containing submicron pinholes are shown in FIGS. 1 and 2. Magnifications are provided as ×1000 in FIG. 1, and ×5000 in FIG. 2. As shall be described below with references to FIGS. 1 and 2, the pinholes can be hardly discerned in magnification of ×1000 (see FIG. 1), and that many pinholes of diameter not greater than 1 $\mu$m can be observed as dark shadows at a magnification of ×5000 (see FIG. 2). Small pits formed in accordance with the conventional method as disclosed in Japanese Patent Publication No. 2000-192281 are of larger diameter of about 10 $\mu$m, and may be present at density of less than about 1 pcs/(10 $\mu$m×10 $\mu$m), and therefore are clearly distinct from the submicron pinholes in accordance with the present invention. As a comparison, a typical surface condition of a conventional Ni plated steel sheet for a positive electrode can which has much fewer sub-micron pinholes and which has inferior battery performance is shown in FIG. 3 (illustrating the magnification of ×5000).

By providing the surface of the Ni based diffusion plating layer with many minute pinholes of diameter not greater than 1 $\mu$m, a certain close chemical adherence may be produced between the Ni based diffusion plating layer on the internal surface of the formed positive electrode can and a conductive coating. Such layer is applied on the internal surface of the formed positive electrode can, thus leading to an improvement of battery characteristics. The Ni based diffusion plating layer is also effective in ensuring adequate primary rust-preventing capability, after being formed into the can, and corrosion resistance in strongly alkaline electrolyte solution.

A Ni based diffusion plating layer refers to a layer in which Ni based plating such as Ni plating (e.g., bright, semi-bright, dull), Ni—Co alloy plating, Ni—Fe alloy plating is applied, followed by heat treatment to convert a part or all of the Ni based plating layer into a diffusion layer. If strain has been introduced into the plating layer during plating process, a number of sub-micron pinholes may be formed when diffusion takes place in the heat treatment process. Specific methods for introducing strain include, for example, plating applied at high current density within the range that does not give rise to a burnt deposit, plating applied at extremely low plating efficiency (for example, using plating bath free of boric acid), and the like. It is desirable (in order to obtain good battery performance) that sub-micron pinholes have, as observed by SEM, diameter of 0.1~1 μm, and are present at density of 30 pcs/(10 μm×10 μm). Pinholes having diameter of 0.1 μm can be distinctly recognized in an image of SEM at magnification of ×5000.

Next, constructive requirements of the surface corresponding to an external surface of a positive electrode are described. As the influence of an external surface of a positive electrode can may be negligibly small related to an improvement of the battery characteristics which is one of the objects of the present invention, the following preferences are not particularly crucial as it concerns the battery characteristics. However, since more stringent and higher corrosion resistance is typically used for an external surface of a positive electrode can, composition of a plating layer that meets this requirement is described below. It is desirable that the surface to be used as an external surface have a Fe—Ni diffusion plating layer with a Ni plating layer on top thereof. This permits good corrosion resistance to be obtained for the terminal portion of the positive electrode which is subjected to particularly severe processing. More preferably, in view of corrosion resistance, the above-mentioned Ni plating layer is softened by the recrystallization. The above-mentioned plating layer having composite structure may be formed, for example, by adopting a method in which an Fe—Ni diffusion layer is formed in a portion of a Ni plating layer by heat treatment after Ni plating, such that Ni is left as it is in the uppermost layer.

As the steel sheet material for the Ni plated steel sheet for a positive electrode can for an alkaline manganese battery of the present invention, ultra-low carbon steel with Ti and Nb added alone or in combination, low carbon Al type steel, B added low carbon steel, or the like, may be preferably used.

The Ni plated steel sheet for a positive electrode can for an alkaline manganese battery according to an exemplary embodiment of the present invention can be manufactured by degreasing and acid pickling of steel sheets followed by Ni plating applied to the steel sheets in a Ni plating bath with current density adjusted to obtain a plating layer of desired thickness, and by subjecting the steel sheet after plating process to heat treatment in an oxygen-free atmosphere at about 800° C. For Ni plating, it may be desirable to use a plating bath of low plating efficiency or to use high current density, within the range that does not give rise to a burnt deposit, in order to introduce strain into the plating layer. Preferably, temper rolling is performed after the heat treatment, as may be preferred.

By using the above-described heat treatment, a Ni diffusion layer is formed between the steel sheet and the plating layer, and, e.g., at the same time, sub-micron pinholes can be formed in the Ni plating layer and/or in the Ni diffusion layer.

Using presses such as a DI press or a transfer press, a positive electrode can for an alkaline manganese battery of the present invention can be obtained from the Ni plated steel sheet thus obtained by a shaping and forming process.

EXAMPLES

Samples in the Examples were fabricated starting from an unannealed Nb—Ti—Sul. C (Ti and Nb containing super low carbon) steel sheet of 0.3 mm in sheet thickness as a sheet material, and after degreasing and acid pickling, Ni based plating was applied under varied plating condition in 2 passes of down-pass and up-pass in a vertical plating cell, followed by heat treatment in an oxygen free atmosphere under varied heat treatment conditions, and then by temper rolling, to obtain samples used in the Examples.

Plating conditions such as type of plating bath, current density, plated amount of Ni plating, etc., and conditions for the heat treatment after plating are as shown in Table 1. For comparison, samples for comparative Examples were fabricated in a method similar that in the Examples. Plating conditions such as type of plating bath, current density, plated amount, etc., and conditions for the heat treatment after plating are as shown in Table 1. Each of the samples was evaluated in observation of surface condition, evaluation of the battery performance, evaluation of corrosion resistance of the can internal surface, and evaluation corrosion resistance of the can external surface, using methods as described below.

TABLE 1

Conditions for Ni plating and for heat treatment

| | | Steel sheet | | | Ni plating condition | | | |
| --- | --- | --- | --- | --- | --- | --- | --- | --- |
| | | | | | Current | Ni plated amount (g/m²) | | |
| Classification | No. | Material | Thickness (mm) | Plating bath | density (A/dm²) | Internal surface | External surface | Heat treatment condition |
| Example | 1 | Nb—Ti—Sul.C | 0.3 | Dull Watt bath[1] | 75 | 12 | 12 | 800° C. × 20 sec |
| | 2 | | | Watt bath[1] | | 4 | 27 | 790° C. × 40 sec |
| | 3 | | | Boric acid free bath[2] | 10 | 18 | 27 | 800° C. × 20 sec |
| Comparative example | 1 | Nb—Ti—Sul.C | 0.3 | Dull Watt bath [1] | 10 | 18 | 18 | 780° C. × 20 sec |

(1) Dull Watt bath: Ni sulfate: 340 g/l: Ni chloride: 70 g/l: boric acid: 45 g/l
(2) Boric acid free bath: Ni sulfate: 200 g/l: sulfuric acid: 10 g/l (Observation of Surface Condition)

The surface corresponding to the can internal surface was observed using SEM (accelerating voltage 15 KV, magnification ×5000). Number of pinholes of 0.1~1 μm in diameter was counted, and was reported as number per 10 μm×10 μm.

(Method for Evaluating Battery Performance)

A positive electrode can formed from the above-mentioned steel sheet samples by press working was used to fabricate an ordinary LR6 type alkaline manganese battery, and the fabricated battery was stored for 40 days at 60° C. and 70% RH. Internal resistance was measured with an AC resistance meter. An internal resistance of 120 mΩ or less was evaluated as ▣, 121~150 mΩ as ○. 151~200 mΩ as Δ, and 201 mΩ~ as ×.

(Method for evaluating corrosion resistance of the can internal surface)

A positive electrode can formed from the above-mentioned steel sheet samples by press working was degreased, and after the end surface was sealed with wax, was allowed to be left in an atmosphere at 60° C. and 90% RH for 3 days. Thereafter, the internal surface was inspected carefully using a loupe (×10) to check for the occurrence of rust. No rust was evaluated as "○", and occurrence of rust was evaluated as "×".

(Method for Evaluating Corrosion Resistance of the Can External Surface)

Corrosion resistance: A positive electrode can formed from the above-mentioned steel sheet samples by press working was degreased, and after the end surface was sealed with wax, was placed in a salt spray tester (in accordance with JIS-Z-2371) with the external surface of the positive electrode terminal facing upwards. After testing for 3 hours, the positive electrode can was removed from the tester, and after being washed with water and dried, was inspected for the presence or absence of red rust. No rust was evaluated as "○", and occurrence of rust was evaluated as "×".

The result is shown in Table 2. As is evident from Table 2, good characteristics were obtained with the Examples of the present invention.

TABLE 2

Result of performance evaluation

| | Condition of surface to be used as can internal surface | | | | |
|---|---|---|---|---|---|
| | Condition of surface | Number of Submicron pinholes (pcs/10 μm × 10 μm) | Battery performance | Corrosion resistance of internal surface | Corrosion resistance of external surface |
| Example | | | | | |
| 1 | As FIG. 2 | 120 | ▣ | ○ | ○ |
| 2 | As FIG. 2 | 170 | ▣ | ○ | ○ |
| 3 | As FIG. 2 | 60 | ▣ | ○ | ○ |
| Comparative example | | | | | |
| 1 | As FIG. 3 | 10 | X | ○ | ○ |

INDUSTRIAL APPLICABILILY

The exemplary embodiments of the present invention provides a plated steel sheet used for a positive electrode can for an alkaline manganese battery and a positive electrode can for an alkaline manganese battery wherein, by forming a Ni-based diffusion plating layer on the surface to be used as an internal surface of the can, such that many sub-micron pinholes are formed on the surface, good battery characteristics can be obtained and, while eliminating the problems associated with the prior art battery, an increase in contact resistance can be prevented even after being stored at high temperature for a long period.

What is claimed is:

1. A Ni plated steel sheet arrangement adapted to be used for a positive electrode can for an alkaline manganese battery, comprising:
    at least one steel sheet portion having a surface to be used as an internal surface of the can; and
    a Ni based diffusion plating layer having pinholes and provided on the surface of the steel sheet portion, the pinholes being observed by a Scanning Electron Microscope to have a diameter in the range of approximately 0.1 μm to 1 μm, and to have a density of at least 30 pcs/(10 μm×10 μm) on the surface of the steel sheet portion.

2. The steel sheet arrangement according to claim 1, further comprising a Fe—Ni diffusion plating layer provided on the surface of the steel sheet portion, wherein the Fe—Ni diffusion plating layer and the Ni based diffusion plating layer are adapted to be used as an external surface of the can.

3. The steel sheet arrangement according to claim 2, wherein the Ni based diffusion plating layer is softened by recrystallization.

4. A positive electrode can arrangement for an alkaline manganese battery, comprising:
    a steel sheet including a surface adapted to be used as an internal surface of the can arrangement; and
    a Ni based diffusion plating layer having pinholes on its surface and provided on the surface of the steel sheet, the pinholes being observed by a Scanning Electron Microscope to have a diameter in the range of approximately 0.1 μm to 1 μm, and to have a density of at least 30 pcs/(10 μm×10 μm) on the surface of the steel sheet.

5. The can arrangement according to claim 4, further comprising a Fe—Ni diffusion plating layer provided on the surface of the steel sheet, wherein the Fe—Ni diffusion plating layer and the Ni based diffusion plating layer are adapted to be used as an external surface of the can arrangement.

a Ni based diffusion plating layer having pinholes on its surface and provided on the surface of the steel sheet, the pinholes being observed by a Scanning Electron Microscope to have a diameter in the range of approximately 0.1 μm to 1 μm, and to have a density of at least 30 pcs/(10 μm×10 μm) on the surface of the steel sheet.

5. The can arrangement according to claim 4, further comprising a Fe—Ni diffusion plating layer provided on the surface of the steel sheet, wherein the Fe—Ni diffusion plating layer and the Ni based diffusion plating layer are adapted to be used as an external surface of the can arrangement.

6. The can arrangement according to claim 4, wherein the Ni based diffusion plating layer is softened by recrystallization.

* * * * *